US008953509B2

United States Patent
Lee et al.

(10) Patent No.: US 8,953,509 B2
(45) Date of Patent: Feb. 10, 2015

(54) METHOD FOR CONTROLLING DISCONTINUOUS RECEPTION IN MOBILE COMMUNICATION DEVICE

(75) Inventors: Kyoungho Lee, Hwaseong-si (KR); Jaepil Chung, Seoul (KR); Chinkyu Kang, Hwaseong-si (KR); Jaeseung Yoon, Yongin-si (KR); Sangbong Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 93 days.

(21) Appl. No.: 13/490,794

(22) Filed: Jun. 7, 2012

(65) Prior Publication Data

US 2013/0016638 A1  Jan. 17, 2013

(30) Foreign Application Priority Data

Jul. 11, 2011 (KR) .................. 10-2011-0068290

(51) Int. Cl.
*H04W 76/04* (2009.01)
*H04W 52/02* (2009.01)

(52) U.S. Cl.
CPC ........ *H04W 52/0251* (2013.01); *H04W 76/048* (2013.01); *H04W 76/046* (2013.01); *Y02B 60/50* (2013.01)
USPC ......................................... 370/311

(58) Field of Classification Search
CPC .................................. H04W 76/048
See application file for complete search history.

(56) References Cited

U.S. PATENT DOCUMENTS

| 8,249,004 | B2* | 8/2012 | Wang et al. ............. 370/329 |
| 2009/0239568 | A1* | 9/2009 | Bertrand et al. ......... 455/522 |
| 2010/0309798 | A1* | 12/2010 | Fodor et al. ............ 370/252 |
| 2011/0002281 | A1* | 1/2011 | Terry et al. ............ 370/329 |
| 2012/0176950 | A1* | 7/2012 | Zhang et al. ............ 370/311 |

FOREIGN PATENT DOCUMENTS

| WO | 2008/111684 A1 | 9/2008 |
| WO | 2008/111823 A1 | 9/2008 |

OTHER PUBLICATIONS

Qualcomm Incorporated, Fast Dormancy, 3GPP Draft, Nov. 15-19, 2010, 3 pages, vol. RAN WG2, Jacksonville, USA.
Research in Motion Limited, Explicit DRX Control, 3GPP Draft, Mar. 26-30, 2007, 2 pages, vol. RAN WG2, St. Julians, Malta.

* cited by examiner

*Primary Examiner* — Huy D Vu
*Assistant Examiner* — Bao G Nguyen
(74) *Attorney, Agent, or Firm* — Jefferson IP Law, LLP (57) ABSTRACT

A method for controlling a discontinuous reception (DRX) in a mobile communication device is provided. According to the method, when a specific application is selected, the device activates a DRX setting timer having a long DRX period for a direct long DRX mode, and enters into the DRX mode. When the setting timer expires in the DRX mode, the device activates the setting timer again and receives control information from a base station in an on-duration zone. The device enters into the DRX mode in response to no reception of valid control information in the on-duration zone, or enters into a continuous mode for executing the specific application in response to reception of valid control information.

15 Claims, 6 Drawing Sheets

METHOD FOR CONTROLLING DISCONTINUOUS RECEPTION IN MOBILE COMMUNICATION DEVICE

PRIORITY

This application claims the benefit under 35 U.S.C. §119 (a) of a Korean patent application filed on Jul. 11, 2011 in the Korean Intellectual Property Office and assigned Serial No. 10-2011-0068290, the entire disclosure of which is hereby incorporated by reference.

BACKGROUND OF THE INVENTION

1. Field of the Invention

The present invention relates generally to communication control technology for mobile communication devices. More particularly, the present invention relates to a method for controlling a discontinuous reception in the mobile devices.

2. Description of the Related Art

Typically, a discontinuous reception (DRX) operation of a mobile device is triggered by a timer or commands provided by a mobile communication system. A control operation for a discontinuous reception in a mobile device according to the related art is described below.

One method for discontinuous reception operation method is based on a timer. This method is controlled by the network, depending on RRCConnectionReconfiguration Message, RRCConnectionSetup Message, RRCConnectionReestablishment Message, and drx-Config field (drx-Config in mac-MainConfig in RadioResourceConfigDedicated) contained in three OTA Messages. The drx-Config field is shown in Table 1.

TABLE 1

```
DRX-Config ::=        CHOICE {
    Release    NULL,
    Setup      SEQUENCE {
        onDurationTimer        ENUMERATED {
                                psf1, psf2, psf3, psf4, psf5,
psf6,
                                psf8, psf10, psf20, psf30,
psf40,
                                psf50, psf60, psf80, psf100,
                                psf200},
        drx-InactivityTimer    ENUMERATED {
                                psf1, psf2, psf3, psf4, psf5,
psf6,
                                psf8, psf10, psf20, psf30,
psf40,
                                psf50, psf60, psf80, psf100,
                                psf200, psf300, psf500,
psf750,
                                psf1280, psf1920, psf2560,
spare10,
                                spare9, spare8, spare7,
spare6,
                                spare5, spare4, spare3,
spare2,
                                spare1},
        drx-RetransmissionTimer  ENUMERATED {
                                psf1, psf2, psf4, psf6, psf8,
psf16,
                                psf24, psf33},
        longDRX-CycleStartOffset  CHOICE {
            sf10      INTEGER(0..9),
            sf20      INTEGER(0..19),
            sf32      INTEGER(0..31),
            sf40      INTEGER(0..39),
            sf64      INTEGER(0..63),
            sf80      INTEGER(0..79),
            sf128     INTEGER(0..127),
```

TABLE 1-continued

```
            sf160     INTEGER(0..159),
            sf256     INTEGER(0..255),
            sf320     INTEGER(0..319),
            sf512     INTEGER(0..511),
            sf640     INTEGER(0..639),
            sf1024    INTEGER(0..1023),
            sf1280    INTEGER(0..1279),
            sf2048    INTEGER(0..2047),
            sf2560    INTEGER(0..2559)
        },
        shortDRX    SEQUENCE {
            shortDRX-Cycle    ENUMERATED {
                              sf2, sf5, sf8, sf10, sf16, sf20,
                              sf32, sf40, sf64, sf80, sf128,
sf160,
                              sf256, sf320, sf512, sf640},
            drxShortCycleTimer   INTEGER (1..16)
        } OPTIONAL
- Need OR
```

Figure 1:
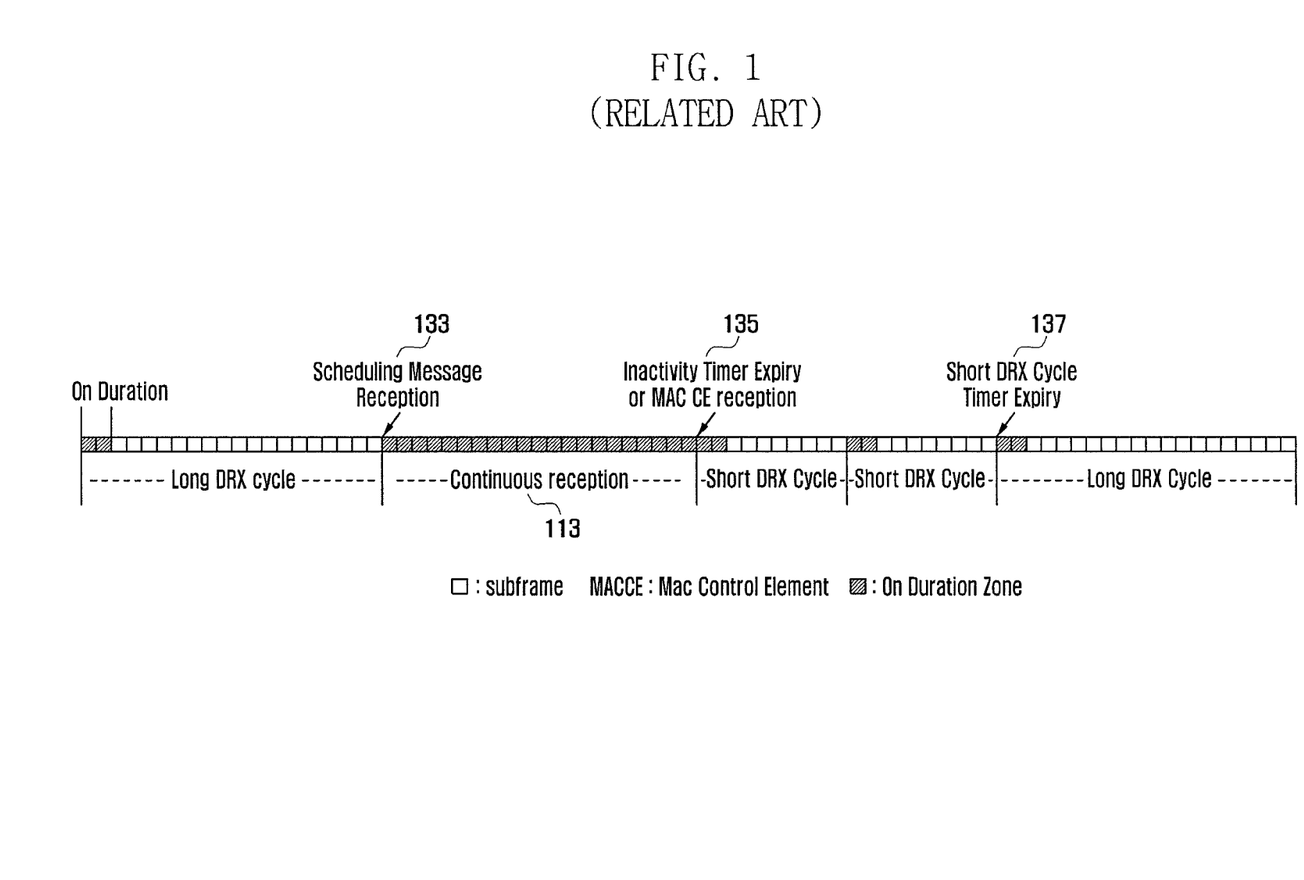
FIG. 1 is a view illustrating the transition among a short DRX mode, a long DRX mode, and a continuous reception mode in a mobile communication system according to the related art.

Another discontinuous reception operation method is based on commands, as shown in FIG. 1.

FIG. 1 is a view illustrating a discontinuous reception operation based on commands in a mobile device according to the related art.

Referring to FIG. 1, the device may operate in a cycle of three modes (i.e., long DRX, short DRX, and continuous reception). In a mobile communication system, the continuous reception is triggered in response to a scheduling message reception as indicated by a reference numeral 133, and PDCCH data can be found in all zones as indicated by a reference numeral 113. The short DRX is triggered in response to the expiration of an inactivity timer or a Media Access Control (MAC) Control Element (CE) reception as indicated by a reference numeral 135. PDCCH may be received only in the on-duration zone, and a DRX mode (sleep) is performed in the other zones. The long DRX is triggered in response to the expiration of a short DRX cycle timer as indicated by a reference numeral 137.

In a mobile communication system according to the related art, the device performs DRX mode transition in response to only the value of a timer or commands provided by the system. However, in these methods, the device may operate in the continuous reception mode or short DRX mode even when data session is not actually used. This may cause the data reception standby time of the device to become longer. For example, when a browser or messenger application is used, mode transition is repeatedly made due to frequent download of low-capacity data. Repetition of circumstances where the device downloads data in the continuous reception mode and remains in the short DRX mode may unfavorably increase power consumption of the device.

SUMMARY OF THE INVENTION

Aspects of the present invention are to address the above-mentioned problems and/or disadvantages and to provide at least the advantages described below. Accordingly, an aspect of the present invention is to provide a method for reducing power consumption through the transition of DRX modes according to circumstances in use of a device when the device operates in the Always ON concept after a booting process.

Another aspect of the present invention is to provide a method for realizing an effective mode transition of the device by specifying a DRX mode having a long period with respect to a specific application having a period and unimportant latency and by performing the specified DRX mode when the specific application is executed.

Another aspect of the present invention is to provide a method for realizing an effective mode transition of the device by specifying a DRX mode having a long period with respect to specific Quality of Service (QoS) Class Identifiers (QCIs) having lower QoS among QCIs of a mobile communication system and then by performing the specified DRX mode when the specific application is executed.

In accordance with an aspect of the present invention, a method for controlling a discontinuous reception (DRX) in a mobile communication device is provided. The method includes, when a specific application is selected, activating a DRX setting timer having a long DRX period for a direct long DRX mode, and entering into the DRX mode, when the setting timer expires in the DRX mode, activating the setting timer again and receiving control information from a base station in an on-duration zone, and entering into the DRX mode in response to no reception of valid control information in the on-duration zone, or entering into a continuous mode for executing the specific application in response to reception of valid control information.

In accordance with another aspect of the present invention, a method for controlling a discontinuous reception (DRX) in a browser application of a mobile communication device is provided. The method includes, when the browser application is selected, activating a DRX setting timer having a long DRX period for a direct long DRX mode, and receiving control information from a base station in an on-duration zone; when valid control information is not received in the on-duration zone, entering into the DRX mode, when the setting timer expires in the DRX mode, activating the setting timer again and receiving the control information from the base station in the on-duration zone, and when the valid control information is received in the on-duration zone, entering into a continuous mode and processing downloaded information.

In accordance with another aspect of the present invention, a method for controlling a discontinuous reception (DRX) in a messenger application of a mobile communication device is provided. The method includes when the messenger application is selected, activating a DRX setting timer having a long DRX period for a direct long DRX mode, and receiving control information from a base station in an on-duration zone, when valid control information is not received in the on-duration zone, entering into the DRX mode, when the setting timer expires in the DRX mode, activating the setting timer again and receiving the control information from the base station in the on-duration zone, and when the valid control information is received in the on-duration zone, entering into a continuous mode and processing received messenger data.

In accordance with another aspect of the present invention, a terminal is provided. The terminal includes a communication unit for transmitting and receiving data, and a control unit for activating a discontinuous reception (DRX) setting timer for a direct long DRX mode and entering into the DRX mode when a specific application is selected, for re-activating the setting timer and waiting to receive control information from a base station via the communication unit in an on-duration zone when the setting timer expires in the DRX mode, and for entering into the DRX mode in response to failure to receive control information in the on-duration zone or entering into a continuous mode for executing the specific application in response to receiving valid control information from the base station via the communication unit.

According to aspects of the present invention, in the Always ON concept operation after a booting process, the device performs the DRX mode having a long period depending on available applications and thereby reduces power consumption. With respect to a specific application having a period and unimportant latency or with respect to specific QCIs having relatively low QoS, the device sets up a DRX mode having a selectively long period and then performs such a DRX mode when the specific application is executed. Therefore, the number of mode transition is reduced and power consumption is also reduced.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding, but these are to be regarded as merely exemplary. Accordingly, those of ordinary skill in the art will recognize that various changes and modifications of the embodiments described herein can be made without departing from the scope of the invention. In addition, descriptions of well-known functions and constructions may be omitted for clarity and conciseness.

The terms and words used in the following description and claims are not limited to the bibliographical meanings, but are merely used by the inventor to enable a clear and consistent understanding of the invention. Accordingly, it should be apparent to those skilled in the art that the following description of exemplary embodiments of the present invention is provided for illustration purposes only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Furthermore, well known or widely used techniques, elements, structures, and processes may not be described or illustrated in detail to avoid obscuring the essence of the present invention. Although the drawings represent exemplary embodiments of the invention, the drawings are not necessarily to scale and certain features may be exaggerated or omitted in order to better illustrate and explain the present invention.

Among terms set forth herein, a "DRX mode" denotes a mode in which a mobile device performs a DRX operation. A "continuous mode" denotes a mode in which a mobile device performs a continuous reception operation. A "direct long DRX mode" denotes a mode in which a mobile device performs a direct transition from the continuous mode to the long DRX mode without performing a short DRX mode. A "setting timer" denotes a timer for setting a zone in which the direct long DRX mode is performed, namely for setting a period to the longest DRX period, defined in a mobile communication system, or less. A "canceling timer" denotes a timer for setting a time for a transition from the continuous mode to the direct long DRX mode. A "setting application" denotes an application that is set to use the direct long DRX mode by the user or device manufacturer.

Long Term Evolution (LTE) systems and devices are now under active research and development. The LTE device operates in the Always on concept after a booting process and immediately receives EPS bearer context (IP information) or the like at the time of operation in the Always on concept. In this operation, the state of an RRC layer, which is one of the LTE protocol layers, becomes the RRC-CONNECTED state, so it is possible to always use data with less signaling. Additionally, since the LTE device may support the DRX mode even in the RRC-CONNECTED state, the LTE device realizes reduced power consumption in comparison with existing 2G or 3G devices. However, if the DRX period is determined only at the network in the DRX mode, the operation properties of applications of the device may not be reflected. Unfortunately, this may make it difficult to effectively control the power consumption of the device. Accordingly, if the device sets up the DRX mode and period in consideration of the operation properties of the device, it is possible to effectively reduce the power consumption of the device. An exemplary embodiment of the present invention proposes a method for setting the DRX mode and period in the device.

A DRX function may be provided in the RRX_IDLE state and the RRC_CONNECTED state. Even though data transmission is carried out, the device may perform DRX operation and thus reduce considerably power consumption. The device repeats the on-duration and the DRX operation, depending on the DRX period. The on-duration denotes the time when the device wakes up and continuously performs data reception operation. The DRX period denotes an interval of time characterized by the repetition of the on-duration. According to an exemplary embodiment of the present invention, the device sets up the DRX mode and period, performs the reception of RDCCH during a specified on-duration, and if valid control information is not received for a specified time, sleeps while performing the DRX operation.

Figure 2:
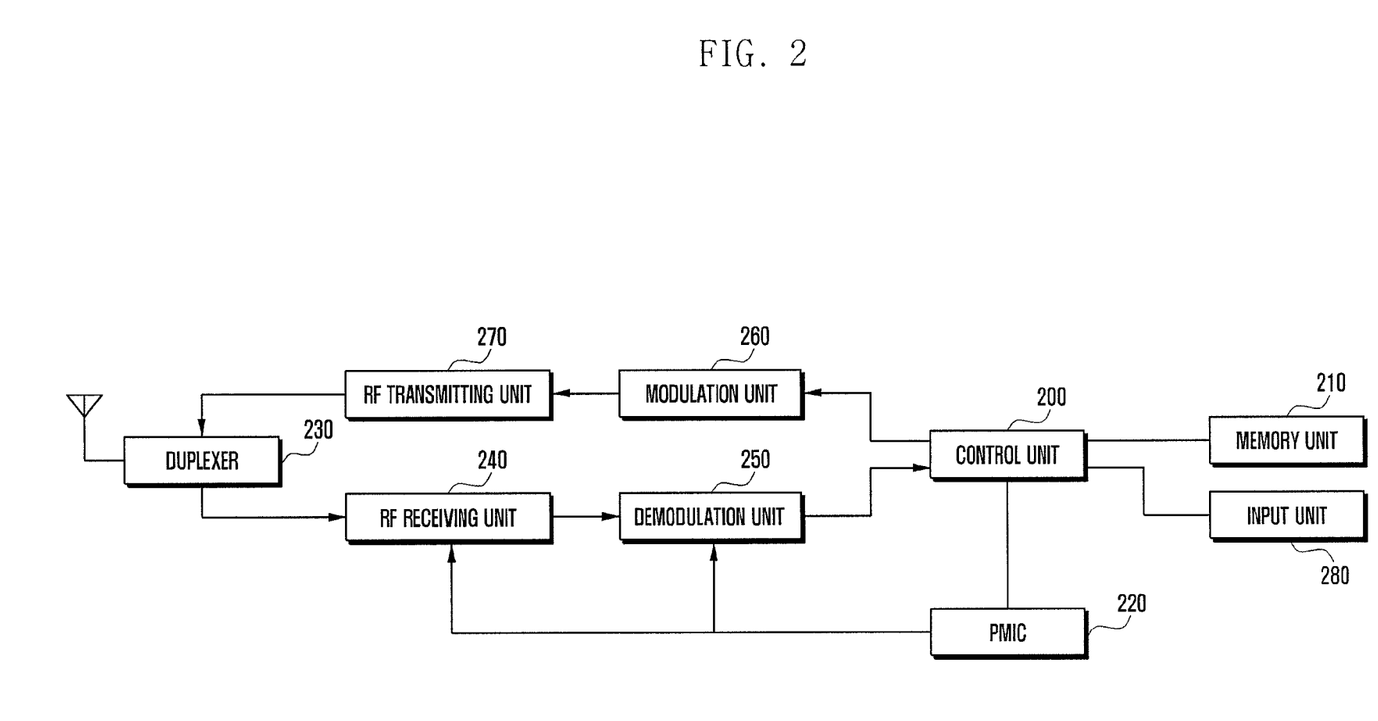
FIG. 2 is a block diagram illustrating the structure of a mobile device according to an exemplary embodiment of the present invention.

FIG. 2 is a block diagram illustrating the structure of a mobile device according to an exemplary embodiment of the present invention.

Referring to FIG. 2, a duplexer 230 is a filter that separates signals received and to be transmitted through an antenna. A modulation unit 260 modulates an outgoing signal of each channel. The modulation unit 260 includes a plurality of uplink channel transmitters, and may use OFDM (Orthogonal Frequency Division Multiplexing) technique for modulation. An RF (Radio Frequency) transmitting unit 270 converts in frequency outgoing signals of the baseband, output from the modulation unit 260, into the RF band and then sends the signals to the duplexer 230. An RF receiving unit 240 converts in frequency RF signals, received through the duplexer 230, into signals of the baseband. A demodulation unit 250 demodulates signals outputted from the RF receiving unit 240. The demodulation unit 250 includes a plurality of downlink channel receivers, and may user OFDM technique for demodulation.

A control unit 200 controls the whole operation of the device and, in particular, controls operation in the DRX mode according to an exemplary embodiment of this invention. A memory unit 210 stores programs and data of the device. An input unit 280 inputs commands and data for controlling the operation of the device. A PMIC (Power Management Integrated Circuit (PMIC) 220 controls power supply for elements of the device. According to an exemplary embodiment of the present invention, the PMIC 220 controls power supply for the RF receiver 240 and the modulation unit 250 in the DRX mode.

As described above, the device may perform the continuous mode, the short DRX mode, and the long DRX mode. Under specific conditions, it may be desirable to directly enter into the long DRX mode without performing the short DRX mode. For example, in case of some applications (e.g., browser, messenger, etc.) having a period and unimportant latency, it is possible to directly enter into the long DRX mode with regard to specific Quality of Service (QoS) Class Indicator (QCI) of LTE. The QCI is defined in the specification 23.203. It may be desirable to directly enter into the long DRX mode (a direct long DRX mode) without entering into the short DRX with regard to the sixth, eighth, and ninth QCIs in LTE QCI. In such cases, it may be desirable that the user can set applications for and/or QCIs for entering into the direct long DRX mode.

Figure 3:
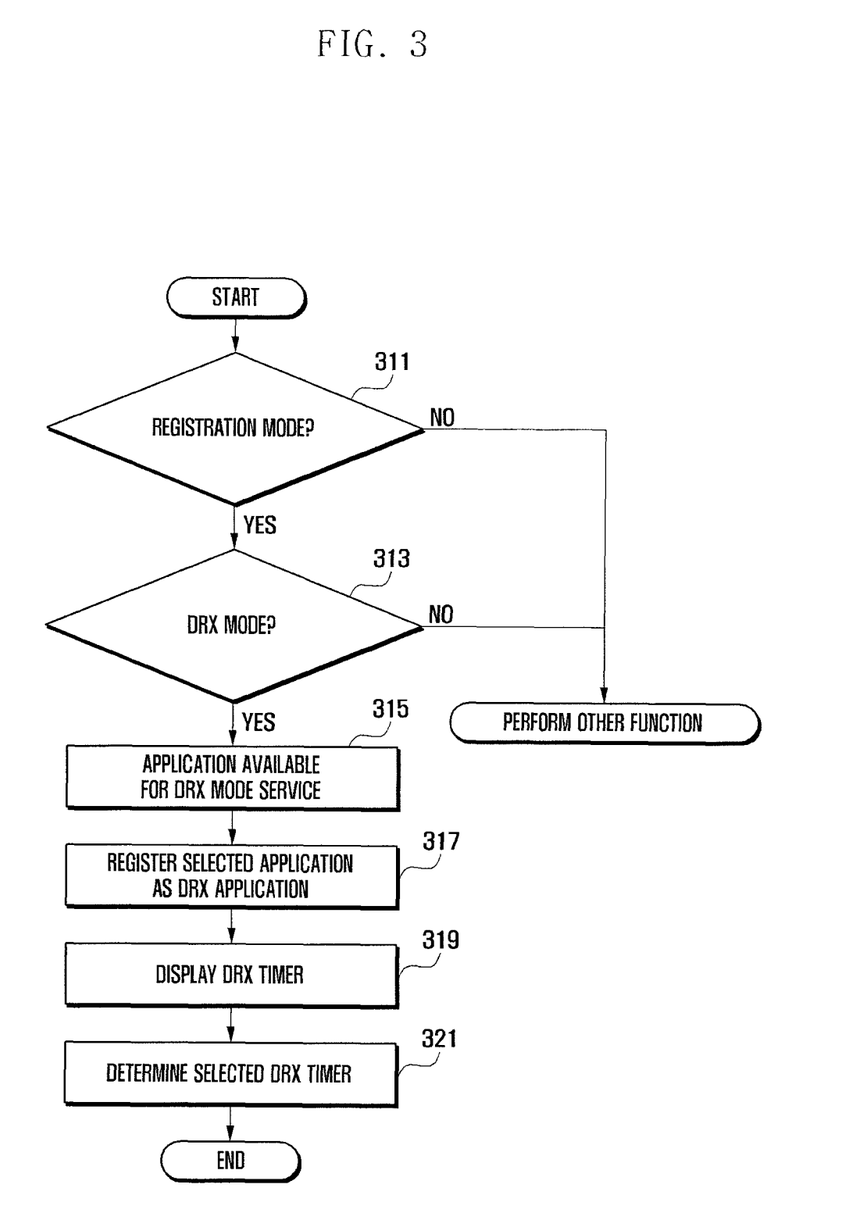
FIG. 3 is a flow diagram illustrating a process of setting an application for entering into a direct long DRX mode and setting a long DRX period in a device according to an exemplary embodiment of the present invention.

FIG. 3 is a flow diagram illustrating a process of setting an application for entering into a direct long DRX mode and setting a long DRX period in a device according to an exemplary embodiment of the present invention.

Referring to FIG. 3, the control unit 200 determines whether the long DRX registration mode is specified in steps 311 and 313, and displays specific applications that are available for the long DRX mode in step 315. Displayed information may be any application that repeatedly opens RRC connection and has unimportant latency or may be any QCI. The control unit 200 registers at least one application or QCI selected by the user through the input unit 280 in the direct long DRX mode in step 317.

If the direct long DRX method is used, the DRX mode of a device (i.e., UE) and of a base station (i.e., E-UTRAN, eNB, etc.) may vary. In this case, the device may sometimes miss a command (such as a scheduling message or a MAC CE command) provided from the base station. In order to remedy such a problem, periodic mutual synchronization (namely, synchronization per longest DRX period) is required to identify missed commands. At present, the longest DRX period of LTE is 2560 ms. Any excess period may cause a problem in synchronization between the device and the base station. Accordingly, the first field of the SFN (system frame number) 256 repeated by 2560 ms from the SFN 1 is always synchronized as the on-duration by the device and the base station. The base station may provide a necessary command to guarantee a reliable operation without missing a command.

After specifying applications for performing the direct long DRX mode, the control unit 200 displays a DRX timer setting page for synchronization between the device and the base station in step 319 and registers a specific timer value selected by the user as a DRX timer for synchronization (namely, synchronization per longest DRX period) in step 321. In the LTE system, the DRX timer may be set to 2560 ms or less.

By implementing the process shown in FIG. 3, the device completes the setting of applications for performing the direct long DRX mode and the setting of the DRX timer for synchronization. Although the setting process shown in FIG. 3 is implemented by the user, applications to perform the direct long DRX mode and the DRX timer for synchronization may be alternatively set up when the device is manufactured.

Figure 4:
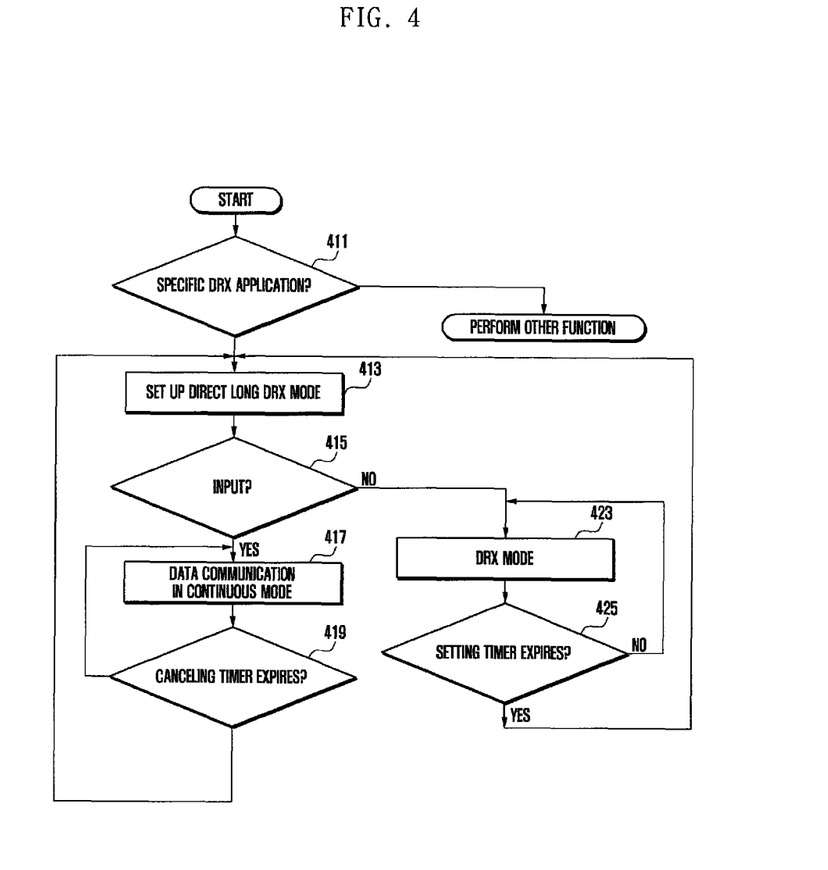
FIG. 4 is a flow diagram illustrating a process of performing a direct long DRX at a mobile device according to an exemplary embodiment of the present invention.

FIG. 4 is a flow diagram illustrating a process of performing a direct long DRX at a mobile device according to an exemplary embodiment of the present invention.

Referring to FIG. 4, when the device is powered on, the control unit 200 enters into the RRC_connected mode with the base station (i.e., default bearer). The device operates in the Always ON concept and performs the DRX mode in no communication state. If the user selects an application specified for the direct long DRX mode through the input unit 280, the control unit 200 recognizes a user selection in step 411 and sets up the direct long DRX mode in step 413.

In step 413, the control unit 200 specifies a DRX setting timer (hereinafter, also referred to as a setting timer) used for a periodic communication with the base station in the long DRX mode, and also specifies an on-duration zone for the reception of PDCCH in a direct long DRX section. The DRX setting timer determines a specific section in which the DRX mode is performed. The on-duration zone denotes a specific section to receive PDCCH data in the DRX section. Additionally, in step 413, the control unit 200 may further set up a continuous canceling timer (i.e., a communication canceling timer, hereinafter referred to as a canceling timer) used for the transition from the continuous mode (i.e., a communication mode) to the direct long DRX mode. The canceling timer determines the time of failure in reception of data packet in the continuous mode. When the canceling timer is deactivated at the end of time interval, the control unit 200 cancels the continuous mode and performs a transition to the direct long DRX mode. A short DRX cycle timer as previously discussed in FIG. 1 may be used as the canceling timer or may be independently configured to perform the direct long DRX mode.

When the DRX setting timer is activated in the direct long DRX mode, the control unit 200 supplies power to both the RF receiving unit 240 and the demodulation unit 250 by controlling the PMIC 220 so as to supply the power in the on-duration section. The control unit 200 receives PDCCH data through the RF receiving unit 240 and the demodulation unit 250 and determines whether there is data to be transmitted to the control unit 200 in step 415. If there is no data to be transmitted as the result of the analysis of PDCCH data in step 415, the control unit 200 performs the transition to the long DRX mode in step 423.

However, if there is data to be transmitted as the result of the analysis of PDCCH data in step 415, the control unit 200 outputs a continuous power control signal to the PMIC 220 in step 417. The PMIC 220 continuously supplies the power to the RF receiving unit 240 and the demodulation unit 250, and the control unit 200 receives and processes downlink data packet in the step 417. In the continuous mode, the control unit 200 determines whether a communication is closed. The control unit 200 activates the canceling timer while data packet is not received, and then activates the canceling timer again just when data packet is received with the canceling timer activated. If no data packet is received until the deactivation of the canceling timer, the control unit 200 recognizes the close of a communication in step 419 and returns to step 413 to perform the transition to the direct long DRX mode.

Since no power is supplied to the RF receiving unit 240 and the demodulation unit 250 in the direct long DRX mode in step 423, the control unit 200 does not perform data reception with power consumption reduced. In the direct long DRX mode, the control unit 200 determines whether the setting timer is deactivated in step 425. If the setting timer is deactivated in step 425, the control unit 200 returns to step 413 to activate the setting timer again and also to examine PDCCH data in the on-duration section specified in the step 415. Where the direct long DRX mode is performed, the device may be different in DRX mode from the base station. In this case, the device may miss a command (such as a scheduling message or a MAC CE command) downloaded from the base station. Accordingly, the control unit 200 of the device identifies missed commands through periodic mutual synchronization while performing the steps 423 and 425.

If the application is terminated while running in the direct long DRX mode, the control unit 200 cancels the direct long DRX mode and then performs other selected function.

Figure 5:
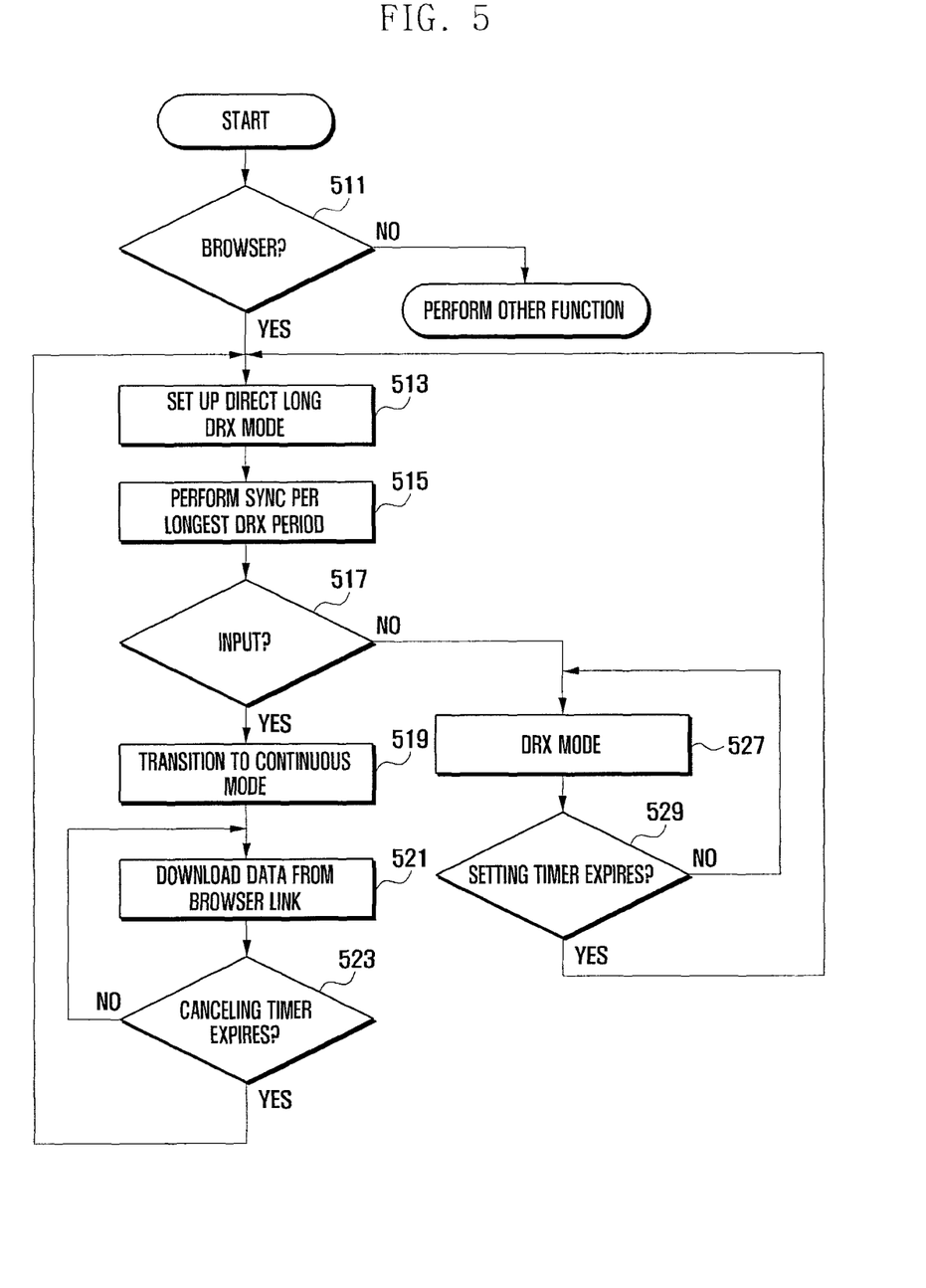
FIG. 5 is a flow diagram illustrating a process of performing a direct long DRX in a browser application of a mobile device according to an exemplary embodiment of the present invention.

FIG. 5 is a flow diagram illustrating a process of performing a direct long DRX in a browser application of a mobile device according to an exemplary embodiment of the present invention.

Referring to FIG. 5, when a browser application is selected, the device accesses the Internet and downloads information or data selected by the user (through a click, a touch, etc.). The device may enter into the continuous mode only during a download of information or data. While downloaded information or data is displayed after the completion of a download, the device does not need to receive downlink data.

When a browser application is selected in step 511, the control unit 200 sets up the direct long DRX mode in step 513. As described above, the control unit 200 sets up the setting timer for setting the DRX mode and also sets up the canceling timer for canceling the continuous mode. The control unit 200 activates the setting timer, controls the PMIC 220 to supply the power to the RF receiving unit 240 and the demodulation unit 250 in the on-duration zone, receives PDCCH data in this zone, and performs sync per longest DRX period operation with the base station in step 515.

The control unit 200 determines whether there is an input requesting a download of data packet (i.e., whether a user's selection action such as a click for downloading data or information is detected) in step 517. If there is an input in step 517, the control unit 200 controls the PMIC 220 to operate in the continuous mode in step 519, and downloads and processes data of the browser link in step 521. In the continuous mode, the control unit 200 activates the canceling timer and determines the time of no data download in step 523. If data is not downloaded before the deactivation of the canceling timer in step 523, the control unit 200 returns to step 513 to perform the direct long DRX mode. In case of a browser application service, if data of a browser link is not received for a given time, the device does not perform the short DRX mode and immediately performs the transition to the direct long DRX mode. As described above, an immediate transition to the long DRX mode after data download reduces power consumption of the device, considering that a browser does not download additional data once the data is downloaded.

If there is no input of a download request in step 517, the control unit 200 performs the direct long DRX mode to reduce power consumption of the device in step 527 and determines whether the setting timer is deactivated in step 529. When the setting timer is deactivated in step 529, the control unit 200 returns to step 513. While repeatedly performing 527, 529, 513, 515 and 517, the control unit 200 performs the direct long DRX mode in response to no data input request and, in the on-duration of the direct long DRX mode, periodically checks control data transmitted from the synchronized base station.

Figure 6:
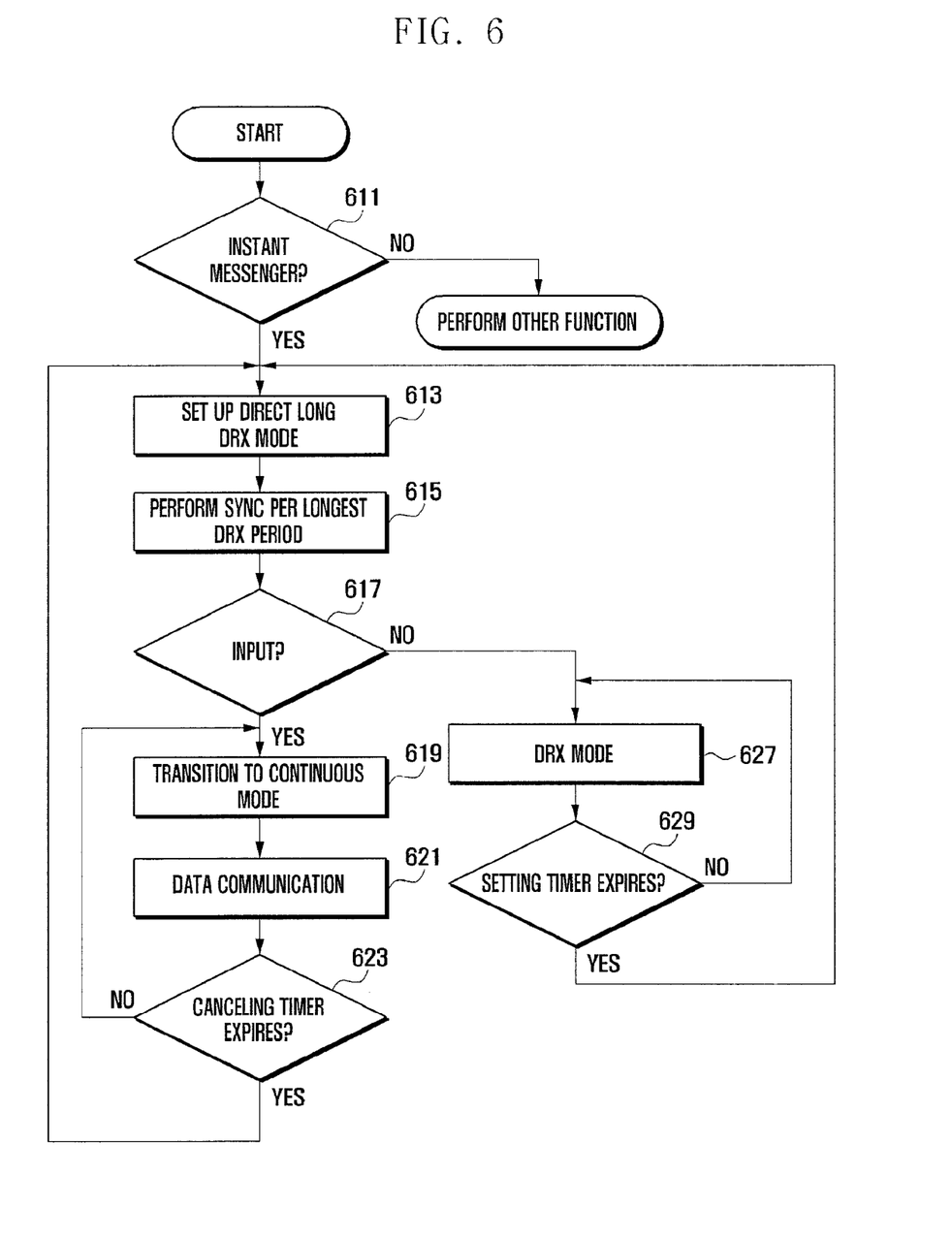
FIG. 6 is a flow diagram illustrating a process of performing a direct long DRX in a messenger application of a mobile device according to an exemplary embodiment of the present invention.

FIG. 6 is a flow diagram illustrating a process of performing a direct long DRX in a messenger application of a mobile device according to an exemplary embodiment of the present invention.

Referring to FIG. 6, a messenger application does not have a given downlink point in time such as a click and does not always require high QoS as VoIP or streaming does. A messenger application merely sends or receives text messages in turn, so the user may not feel a variation of QoS in spite of some latency. Accordingly, in the case of a messenger application, the device performs the transition to the direct long DRX mode when the user enters message letters, and cancels the direct long DRX mode when sender's text message is received. This process performed repeatedly may reduce latency.

When a messenger application is selected in step 611, the control unit 200 sets up the direct long DRX mode in step 613. As described above, the control unit 200 sets up the setting timer for setting the DRX mode and also sets up the canceling timer for canceling the continuous mode. The control unit 200 activates the setting timer, controls the PMIC 220 to supply the power to the RF receiving unit 240 and the demodulation unit 250 in the on-duration zone, receives PDCCH data in this zone, and performs sync per longest DRX period operation with the base station in step 615.

If there is no data to be inputted to the device in step 617, the control unit performs the DRX mode while the setting timer is activated in step 627. In the DRX mode, the control unit 200 transmits messenger data through the transmitter. The control unit 200 determines whether the setting timer is deactivated in step 629. When the setting timer is deactivated in step 629, the control unit 200 returns to step 613. While repeatedly performing the above steps, the control unit 200 performs the direct long DRX mode.

If there is a reception request for messenger data from a sender (i.e., another subscriber) in the DRX mode, the control unit 200 recognizes this during a synchronization with the base station (namely, during reception of PDCCH data from the base station) in the step 615. If messenger data occurs from a subscriber, the device receives an indication of the messenger data from the base station via PDCCH data in step 617. The control unit 200 controls the PMIC 220 to operate in the continuous mode in step 619 and receives messenger data from the sender through the RF receiving unit 240 and the demodulation unit 250 in step 621. In this case, the control unit 200 may recognize messenger data only after a time specified in the direct long DRX has passed. However, since a messenger application merely sends or receives text messages between the device user and other subscriber, they may not feel inconvenience in spite of some latency.

In the continuous mode, the control unit 200 activates the canceling timer and determines when the sender stops transmitting the messenger data in step 623. If there is no transmission of messenger data from the sender until the deactivation of the canceling timer in step 623, the control unit 200 returns to step 613 to perform the direct long DRX mode. In case of a messenger application service, if messenger data is not received from other subscriber for a given time, the device does not perform the short DRX mode and immediately performs the transition to the direct long DRX mode. An immediate transition to the long DRX mode during the transmission of message from the user reduces power consumption of the device, considering that a messenger exchanges text messages.

While this invention has been shown and described with reference to an exemplary embodiment thereof, it will be understood by those skilled in the art that various changes in form and details may be made therein without departing from the spirit and scope of the invention as defined by the appended claims and their equivalents.

What is claimed is:

1. A method for controlling a discontinuous reception (DRX) in a mobile communication device, the method comprising:
   when a specific application is selected, activating a DRX setting timer having a long DRX period for a direct long DRX mode, and entering into the DRX mode;
   when the setting timer expires in the DRX mode, activating the setting timer again and receiving control information from a base station in an on-duration zone;
   determining whether the control information received in the on-duration is valid control information;
   when no valid control information is received in the on-duration, entering into the DRX mode; and
   when valid control information is received, entering into a continuous mode for executing the specific application.

2. The method of claim 1, further comprising:
   if there is no reception data in the continuous mode until the expiration of a continuous canceling timer, activating the setting timer and entering into the DRX mode.

3. The method of claim 2, further comprising:
   registering the direct long DRX mode, the registering of the direct long DRX mode including:
      specifying the specific application for performing the direct long DRX mode;
      specifying the period of the setting timer and the on-duration; and
      specifying a period of the canceling timer.

4. The method of claim 3, wherein the specific application is a browser application or a messenger application.

5. The method of claim 4, wherein the period of the setting timer is less than or equal to the longest DRX period defined in a mobile communication system.

6. A method for controlling a discontinuous reception (DRX) in a browser application of a mobile communication device, the method comprising:
   when the browser application is selected, activating a DRX setting timer having a long DRX period for a direct long DRX mode, and receiving control information from a base station in an on-duration;
   determining whether the received control information is valid control information;
   when no valid control information is received in the on-duration, entering into the DRX mode;
   when the setting timer expires in the DRX mode, activating the setting timer again and receiving the control information from the base station in the on-duration; and when valid control information is received in the on-duration, entering into a continuous mode and processing downloaded information.

7. The method of claim 6, further comprising:
if there is no reception data in the continuous mode until the expiration of a continuous canceling timer, activating the setting timer and receiving the control information from the base station in the on-duration.

8. A method for controlling a discontinuous reception (DRX) in a messenger application of a mobile communication device, the method comprising:
when the messenger application is selected, activating a DRX setting timer having a long DRX period for a direct long DRX mode, and receiving control information from a base station in an on-duration;
determining whether the received control information is valid control information;
when no valid control information is received in the on-duration, entering into the DRX mode;
when the setting timer expires in the DRX mode, activating the setting timer again and receiving the control information from the base station in the on-duration; and
when valid control information is received in the on-duration, entering into a continuous mode and processing received messenger data.

9. The method of claim 8, further comprising:
if there is no reception data in the continuous mode until the expiration of a continuous canceling timer, activating the setting timer and receiving the control information from the base station in the on-duration.

10. A terminal, comprising:
a communication unit configured to transmit and receive data; and
a control unit configured to activate a discontinuous reception (DRX) setting timer for a direct long DRX mode and enter into the DRX mode when a specific application is selected, to re-activate the setting timer and to wait to receive control information from a base station via the communication unit in an on-duration when the setting timer expires in the DRX mode, to determine whether valid control information is received, to enter into the DRX mode when no valid control information is received in the on-duration, and to enter into a continuous mode wherein the specific application is executed in response to receiving valid control information from the base station via the communication unit.

11. The terminal of claim 10, wherein the controller registers one of a plurality of applications stored in a storage unit of the terminal as the specific application.

12. The terminal of claim 11, wherein the plurality of applications are applications which repeatedly open a Radio Resource Control (RRC) connection and do not require a predetermined latency for operation.

13. The terminal of claim 11, wherein the controller registers one of the plurality of applications as the specific application according to input from a user of the terminal.

14. The terminal of claim 11, wherein the controller registers one of the plurality of applications as the specific application according to input from a manufacturer of the terminal.

15. The terminal of claim 10, wherein the specific application is a browser application or a messenger application.

* * * * *